United States Patent
Sone et al.

(10) Patent No.: US 11,180,138 B2
(45) Date of Patent: Nov. 23, 2021

(54) AUTONOMOUS DRIVING SYSTEM

(71) Applicant: TOYOTA JIDOSHA KABUSHIKI KAISHA, Toyota (JP)

(72) Inventors: Atsushi Sone, Toyota (JP); Yoji Kunihiro, Susono (JP); Takahiro Yokota, Susono (JP); Ryo Irie, Okazaki (JP); Yoshinori Watanabe, Isehara (JP); Masateru Amano, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 317 days.

(21) Appl. No.: 15/899,822

(22) Filed: Feb. 20, 2018

(65) Prior Publication Data
US 2018/0304890 A1    Oct. 25, 2018

(30) Foreign Application Priority Data
Apr. 19, 2017  (JP) .............................. JP2017-082894

(51) Int. Cl.
*B60W 30/10* (2006.01)
*G05D 1/02* (2020.01)
(Continued)

(52) U.S. Cl.
CPC ............. *B60W 30/10* (2013.01); *B62D 15/02* (2013.01); *B62D 15/025* (2013.01);
(Continued)

(58) Field of Classification Search
CPC .................................................. B60W 30/01
(Continued)

(56) References Cited

U.S. PATENT DOCUMENTS 6,123,671 A * 9/2000 Miller ................. G01S 7/52046
                                                                  600/447
9,171,464 B2   10/2015 Khetan et al.
(Continued)

FOREIGN PATENT DOCUMENTS

| JP | 08160852 A | * | 6/1996 |
| JP | 2010-173616 A | | 8/2010 |
| JP | 2016-99713 A | | 5/2016 |

OTHER PUBLICATIONS

Google Translation of JP H08160852A (downloaded on Jan. 27, 2020).*
(Continued)

*Primary Examiner* — Jean Paul Cass
(74) *Attorney, Agent, or Firm* — Oliff PLC

(57) ABSTRACT

An autonomous driving system mounted on a vehicle determines a target path based on necessary information and performs vehicle travel control such that the vehicle follows the target path. A first coordinate system is a vehicle coordinate system at a first timing when the necessary information is acquired. A second coordinate system is a vehicle coordinate system at a second timing later than the first timing. The autonomous driving system calculates, based on the necessary information acquired at the first timing, a first target path defined in the first coordinate system. Then, the autonomous driving system corrects the first target path to a second target path defined in the second coordinate system by performing coordinate transformation from the first coordinate system to the second coordinate system. The autonomous driving system uses the second target path as the target path to perform the vehicle travel control.

4 Claims, 18 Drawing Sheets

(51) Int. Cl.
  *G05D 1/00* (2006.01)
  *B62D 15/02* (2006.01)
(52) U.S. Cl.
  CPC ......... *G05D 1/0088* (2013.01); *G05D 1/0212*
    (2013.01); *G05D 2201/0213* (2013.01)
(58) Field of Classification Search
  USPC .......................................................... 701/25
  See application file for complete search history.

(56) References Cited

U.S. PATENT DOCUMENTS

| | | | | |
|---|---|---|---|---|
| 9,201,424 | B1* | 12/2015 | Ogale | G05D 1/0253 |
| 9,501,058 | B1 | 11/2016 | Mariet et al. | |
| 10,106,154 | B2* | 10/2018 | Nguyen Van | G05D 1/0238 |
| 10,140,450 | B1* | 11/2018 | Litichever | H04L 69/22 |
| 2002/0034337 | A1* | 3/2002 | Shekter | G06T 5/002 |
| | | | | 382/275 |
| 2004/0054434 | A1* | 3/2004 | Sturges | E21F 13/08 |
| | | | | 700/213 |
| 2009/0084173 | A1* | 4/2009 | Gudat | G01S 17/88 |
| | | | | 73/146 |
| 2010/0063813 | A1* | 3/2010 | Richter | G10L 15/02 |
| | | | | 704/231 |
| 2013/0325244 | A1* | 12/2013 | Wang | G06T 11/00 |
| | | | | 701/26 |
| 2016/0018822 | A1* | 1/2016 | Nevdahs | G05D 1/0094 |
| | | | | 701/26 |
| 2016/0139598 | A1 | 5/2016 | Ichikawa et al. | |
| 2017/0007334 | A1* | 1/2017 | Crawford | A61B 90/37 |
| 2017/0149820 | A1* | 5/2017 | Ruvio | H04L 63/1441 |
| 2017/0168134 | A1* | 6/2017 | Jenwatanavet | G01S 5/0273 |
| 2017/0244937 | A1* | 8/2017 | Meier | G11B 27/34 |
| 2017/0309066 | A1* | 10/2017 | Bybee | G06T 15/04 |
| 2018/0024562 | A1* | 1/2018 | Bellaiche | G06T 7/73 |
| | | | | 701/26 |
| 2018/0304890 | A1* | 10/2018 | Sone | B60W 30/10 |
| 2018/0364717 | A1* | 12/2018 | Douillard | G06K 9/00791 |
| 2019/0011265 | A1 | 1/2019 | Iwata et al. | |
| 2019/0066330 | A1* | 2/2019 | Luo | G06T 17/05 |
| 2019/0066344 | A1* | 2/2019 | Luo | G06K 9/6215 |
| 2019/0072965 | A1* | 3/2019 | Zhang | G05D 1/0088 |
| 2019/0072966 | A1* | 3/2019 | Zhang | G08G 1/166 |
| 2019/0079177 | A1* | 3/2019 | Lee | G01S 13/48 |
| 2019/0079193 | A1* | 3/2019 | Gunnam | G01S 7/4817 |
| 2019/0270457 | A1* | 9/2019 | Chen | H04W 4/027 |
| 2019/0347821 | A1* | 11/2019 | Stein | G05D 1/0246 |
| 2019/0377349 | A1* | 12/2019 | van der Merwe | G06Q 50/12 |
| 2020/0020143 | A1* | 1/2020 | Yu | B60R 1/00 |
| 2020/0072620 | A1* | 3/2020 | Gustafsson | G01S 19/49 |
| 2020/0082621 | A1* | 3/2020 | Son | G06T 19/003 |
| 2020/0189584 | A1* | 6/2020 | Nakanishi | B60W 30/095 |
| 2020/0263957 | A1 | 8/2020 | Northrup | |

OTHER PUBLICATIONS

Kim, et al., Lane Confidence Assessment and Lane Change Decision for Lane-level Localization, 2014 14th International Conference on Control, Automation and Systems (ICCAS 2014) Oct. 22-25, 2014 in KINTEX, Gyeonggi-do, Korea (hereinafter "Kim").*
Mar. 10, 2021 Office Action issued in U.S. Appl. No. 16/851,613.
Jul. 8, 2021 Office Action issued in U.S. Appl. No. 16/851,613.

* cited by examiner

AUTONOMOUS DRIVING SYSTEM

BACKGROUND

Technical Field

The present disclosure relates to an autonomous driving system. In particular, the present disclosure relates to an autonomous driving system that controls travel of a vehicle to follow a target path.

Background Art

Patent Literature 1 discloses a vehicle travel support device that supports travel of a vehicle. The vehicle travel support device calculates a control command value for avoiding an obstacle, based on vehicle motion state and obstacle state detected by sensors. More specifically, the vehicle travel support device calculates both a low-precision first control command value and a high-precision second control command value. A time required for calculating the high-precision second control command value is longer than a time required for calculating the low-precision first control command value. That is, calculation delay occurs when calculating the second control command value. In order to compensate for such the calculation delay, the vehicle travel support device uses the vehicle motion state and the obstacle state detected by the sensors to "predict" future vehicle motion state and obstacle state the calculation delay time after. Then, the vehicle travel support device calculates the high-precision second control command value based on the predicted future vehicle motion state and obstacle state.

Patent Literature 2 discloses an autonomous driving system. The autonomous driving system has: a surrounding information detection unit that detects surrounding information of a vehicle; a travel plan generation unit that generates a travel plan of the vehicle based on the detected surrounding information and map information; and a travel control unit that autonomously controls travel of the vehicle according to the generated travel plan.

LIST OF RELATED ART

Patent Literature 1: Japanese Laid-Open Patent Publication No. 2010-173616

Patent Literature 2: Japanese Laid-Open Patent Publication No. 2016-099713

SUMMARY

Let us consider "path-following control" performed by an autonomous driving system. In the path-following control, the autonomous driving system periodically calculates a target path for a vehicle, and controls travel of the vehicle so as to follow the latest target path. In the path-following control, control delay may occur due to various factors.

For example, one factor for the control delay is a calculation time required for calculating the target path. Information necessary for calculating the target path is acquired at a predetermined timing, and the calculation of the target path based on the acquired information is completed after the predetermined timing. Such the calculation time required for calculating the target path causes the control delay.

The control delay of the path-following control causes decrease in performance of following the target path. When the path-following performance of the autonomous driving system is decreased, an occupant of the vehicle feels senses of anxiety and strangeness, which leads to decrease in confidence in the autonomous driving system.

According to the technique disclosed in the above-mentioned Patent Literature 1, the calculation delay is taken into consideration when calculating the high-precision second control command value. More specifically, the vehicle motion state and the obstacle state detected by the sensors are used to "predict" future vehicle motion state and obstacle state the calculation delay time after. Then, the high-precision second control command value is calculated based on the predicted future vehicle motion state and obstacle state. However, predicting the vehicle motion state and the obstacle state requires complicated computation processing, which causes increase in computation load, computation time, and computational resource.

An object of the present disclosure is to provide a technique that can increase path-following performance with suppressing increase in computation load, in an autonomous driving system that controls travel of a vehicle so as to follow a target path.

A first disclosure provides an autonomous driving system mounted on a vehicle.

The autonomous driving system includes:

a necessary information acquisition unit periodically acquiring necessary information that is necessary for calculating a target path;

a target path determination unit determining the target path based on the necessary information; and a vehicle travel control unit performing vehicle travel control that controls travel of the vehicle so as to follow the target path.

A vehicle coordinate system is a relative coordinate system fixed to the vehicle.

A first timing is a timing when the necessary information acquisition unit acquires the necessary information.

A first coordinate system is the vehicle coordinate system at the first timing.

A second coordinate system is the vehicle coordinate system at a second timing later than the first timing.

The target path determination unit includes:

a target path calculation unit calculating, based on the necessary information acquired at the first timing, a first target path defined in the first coordinate system; and a target path correction unit correcting the first target path to a second target path defined in the second coordinate system by performing coordinate transformation from the first coordinate system to the second coordinate system.

The vehicle travel control unit uses the second target path as the target path to perform the vehicle travel control.

A second disclosure further has the following features in addition to the first disclosure.

A delay time from the first timing to the second timing is predetermined.

A third disclosure further has the following features in addition to the first or second disclosure.

A delay time from the first timing to the second timing corresponds to a time required for the target path calculation unit to calculate the first target path.

A fourth disclosure further has the following features in addition to the third disclosure.

The target path determination unit determines and updates the target path every time the necessary information acquisition unit acquires the necessary information.

The target path determination unit determines a new target path such that a certain section from beginning of the new target path overlaps a previous target path.

The certain section includes at least a section corresponding to a period from the first timing to the second timing.

According to the first disclosure, the autonomous driving system performs target path correction processing in the path-following control. More specifically, the autonomous driving system corrects the first target path defined in the first coordinate system to the second target path defined in the second coordinate system. The first coordinate system is the vehicle coordinate system at the first timing when the necessary information is acquired. The second coordinate system is the vehicle coordinate system at the second timing later than the first timing. Influence of the control delay is reduced by the target path correction processing. Therefore, when the second target path after the correction is used to perform the vehicle travel control, control error becomes smaller and control accuracy becomes higher as compared with a case where the first target path, is used. In other words, the performance of following the target path is increased. When the path-following performance of the autonomous driving system is increased, the senses of anxiety and strangeness of the vehicle occupant are reduced, which contributes to increase in confidence in the autonomous driving system.

Moreover, complicated computation processing is unnecessary for the target path correction processing. It is possible to easily obtain the second target path by performing simple coordinate transformation from the first coordinate system to the second coordinate system. There is no need to predict the necessary information to be acquired at the second timing in order to calculate the second target path. Since complicated prediction processing is unnecessary, increase in computation load is suppressed. According to the first disclosure, as described above, it is possible to increase the path-following performance with suppressing increase in the computation load.

According to the second disclosure, the delay time from the first timing to the second timing is predetermined. In this case, the target path correction processing is further simplified, which is preferable.

According to the third disclosure, the delay time from the first timing to the second timing corresponds to a time required for the target path calculation processing. In this case, it is possible to reduce influence of the control delay caused by the target path calculation time.

According to the fourth disclosure, the new target path is determined such that a certain section from the beginning of the new target path overlaps the previous target path. As a result, the new target path and the previous target path are connected smoothly. Therefore, discontinuous change in a vehicle control amount is suppressed when the target path used for the vehicle travel control is switched. As a result, sudden change and disturbance in vehicle behavior are suppressed.

EMBODIMENTS

Embodiments of the present disclosure will be described below with reference to the attached drawings.

Figure 1:
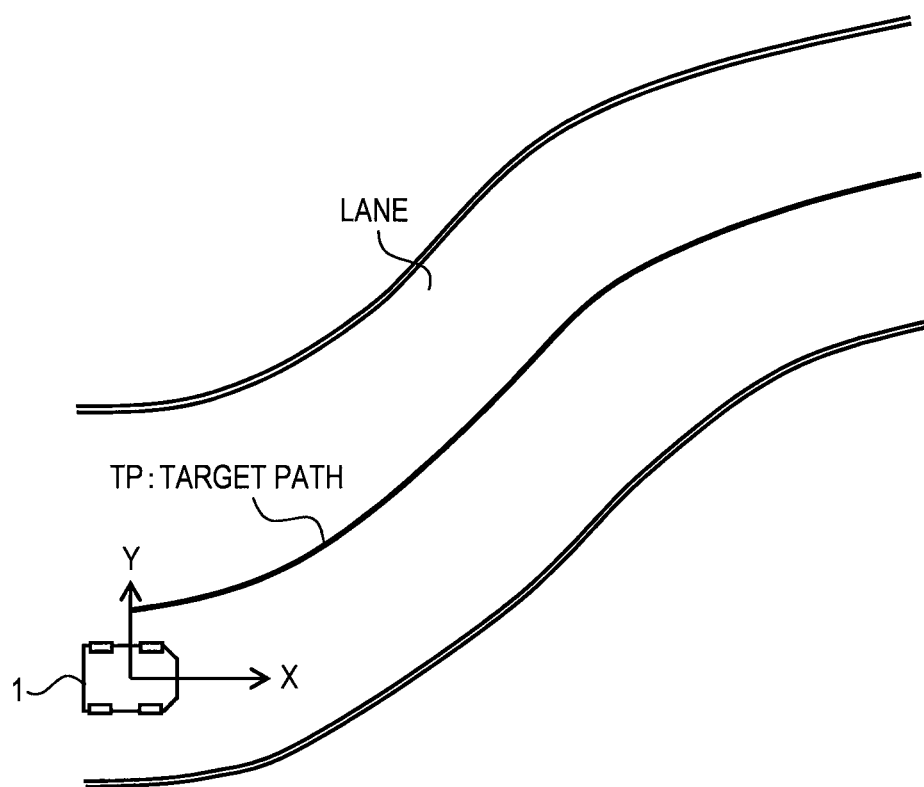
FIG. 1 is a conceptual diagram for explaining path-following control by an autonomous driving system according to a first embodiment of the present disclosure.

1. First Embodiment 1-1. Outline of Path-Following Control by Autonomous Driving System FIG. 1 is a conceptual diagram for explaining path-following control by an autonomous driving system according to the present embodiment. The autonomous driving system is mounted on a vehicle 1 and controls autonomous driving of the vehicle 1. The path-following control is a kind of the autonomous driving control. More specifically, in the path-following control, the autonomous driving system periodically calculates a target path TP for the vehicle 1, and controls travel of the vehicle 1 so as to follow the latest target path TP.

Here, let us define a vehicle coordinate system (X, Y). The vehicle coordinate system is a relative coordinate system fixed to the vehicle 1 and varies with motion of the vehicle 1. That is, the vehicle coordinate system is defined by a position and an orientation of the vehicle 1. In the example shown in FIG. 1, the X-direction is a front direction of the vehicle 1, and the Y-direction is a planar direction orthogonal to the X-direction. However, the vehicle coordinate system is not limited to the example shown in FIG. 1.

The path-following control is performed based on the vehicle coordinate system. That is, the autonomous driving system periodically calculates the target path TP in the vehicle coordinate system. Then, the autonomous driving system controls travel of the vehicle 1 so as to follow the latest target path TP. Controlling the travel of the vehicle 1 so as to follow the target path TP is hereinafter referred to as "vehicle travel control".

Figure 2:
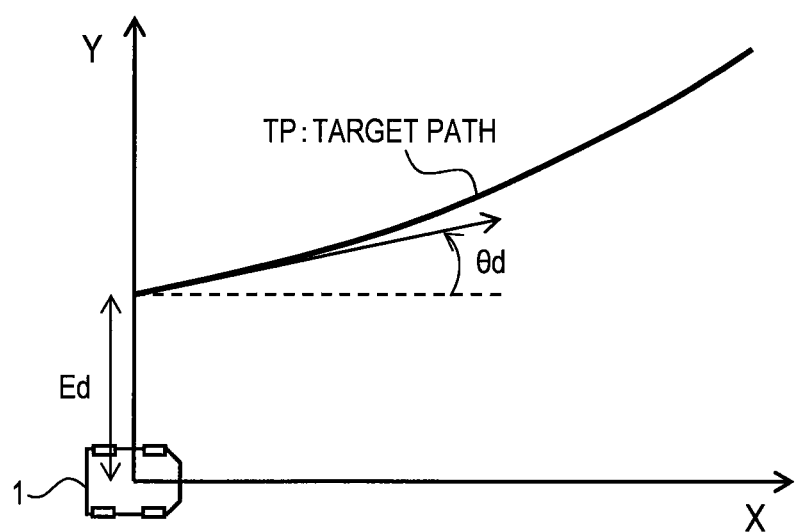
FIG. 2 is a conceptual diagram for explaining vehicle travel control in the first embodiment of the present disclosure.

FIG. 2 is a conceptual diagram for explaining the vehicle travel control. An example of a positional relationship between the vehicle 1 and the target path TP in the vehicle coordinate system is shown in FIG. 2. In the vehicle travel control, deviation of the vehicle 1 from the target path TP is controlled to be reduced in order to make the vehicle 1 follow the target path TP. For that purpose, for example, parameters such as a lateral deviation Ed, an orientation angle difference θd, a curvature of the target path TP, and the like are taken into consideration. The lateral deviation Ed is an Y-direction deviation of the vehicle 1 from the target path TP. The orientation angle difference θd is a difference in an angle of orientation between the vehicle 1 and the target path TP. The autonomous driving system can perform the vehicle travel control based on the lateral deviation Ed, the orientation angle difference θd, the curvature of the target path TP, and the like.

The inventors of the present application have recognized the following problem with regard to the path-following control. That is, in the path-following control, control delay may occur due to various factors. The control delay of the path-following control causes decrease in performance of following the target path TP, which is not preferable. The various factors for the control delay include an information communication time, a calculation processing time, an actuator response time, and so forth. Among them, what is considered to most contribute to the control delay is a calculation time required for calculating the target path T, that is, a target path calculation time.

Figure 3:
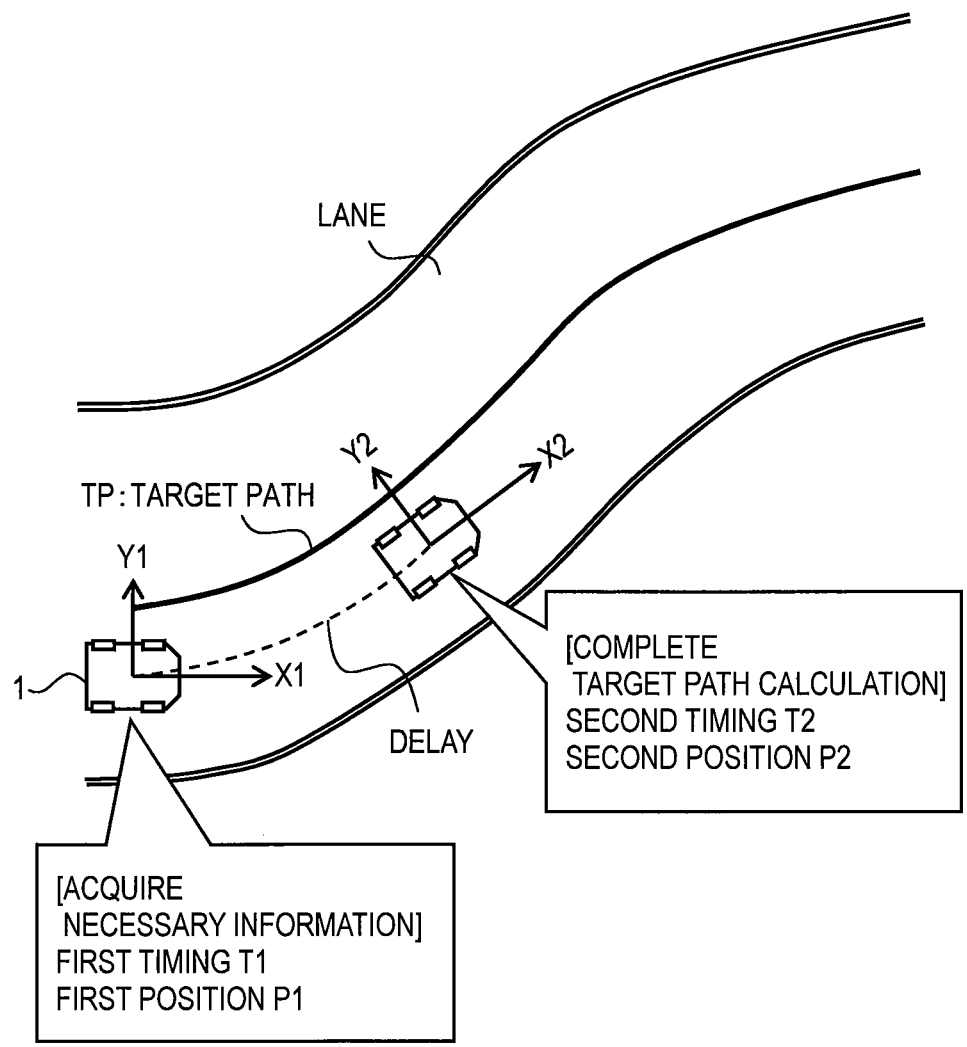
FIG. 3 is a conceptual diagram for explaining control delay due to a target path calculation time in the first embodiment of the present disclosure.

FIG. 3 is a conceptual diagram for explaining the control delay due to the target path calculation time. At a first timing T1, the autonomous driving system acquires information necessary for calculating the target path TP. The information necessary for calculating the target path TP is hereinafter referred to as "necessary information". Then, the autonomous driving system calculates a new target path TP based on the acquired necessary information. It takes some time to calculate the target path TP, and thus the calculation of the target path TP is completed at a second timing T2 later than the first timing T1. A period from the first timing T1 to the second timing T2 corresponds to the target path calculation time.

In FIG. 3, a first position P1 is a position of the vehicle 1 at the first timing T1. A second position P2 is a position of the vehicle 1 at the second timing T2. A first coordinate system (X1, Y1) is the vehicle coordinate system at the first timing T1, that is, at the first position P1. A second coordinate system (X2, Y2) is the vehicle coordinate system at the second timing T2, that is, at the second position P2. The first coordinate system and the second coordinate system are different from each other by an amount corresponding to the target path calculation time. Therefore, "appearance" of the target path TP differs between in the first coordinate system and in the second coordinate system.

Figure 4:
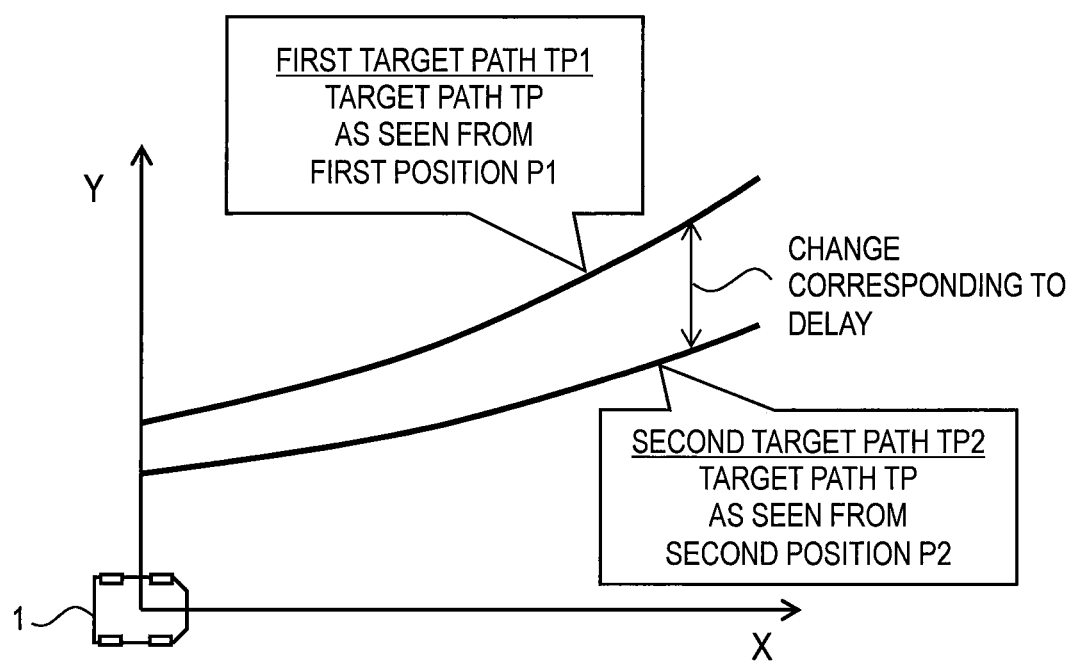
FIG. 4 is a conceptual diagram showing difference in appearance of a target path between a first coordinate system and a second coordinate system in the first embodiment of the present disclosure.

FIG. 4 shows difference in appearance of the target path TP between the first coordinate system and the second coordinate system. In FIG. 4, a first target path TP1 represents the target path TP as seen from the first position P1, that is, the target path TP defined in the first coordinate system. On the other hand, a second target path TP2 represents the target path TP as seen from the second position P2, that is, the target path TP defined in the second coordinate system. The first target path TP1 and the second target path TP2 are different from each other by an amount corresponding to the target path calculation time.

Here, let us consider the vehicle travel control (see FIG. 2) by the autonomous driving system. The vehicle travel control based on a new target path TP can be naturally started after the new target path TP is determined, that is, after the second position P2 (the second timing T2). When the vehicle travel control is performed after the second position P2, higher control accuracy can be obtained by using the second target path TP2 rather than the first target path TP1 to perform the vehicle travel control. However, it is impossible to directly calculate the second target path TP2 from the necessary information. The reason is that the necessary information is the information acquired at the first position P1 (first timing T1). What can be calculated by the use of the necessary information acquired at the first position P1 is only the first target path TP1 defined in the first coordinate system.

When the first target path TP1 defined in the first coordinate system is used to perform the vehicle travel control, control error becomes larger and control accuracy becomes lower as compared with a case where the second target path TP2 defined in the second coordinate system is used. In other words, the performance of following the target path TP is decreased. When the path-following performance of the autonomous driving system is decreased, an occupant of the vehicle 1 feels senses of anxiety and strangeness, which leads to decrease in confidence in the autonomous driving system.

Figure 5:
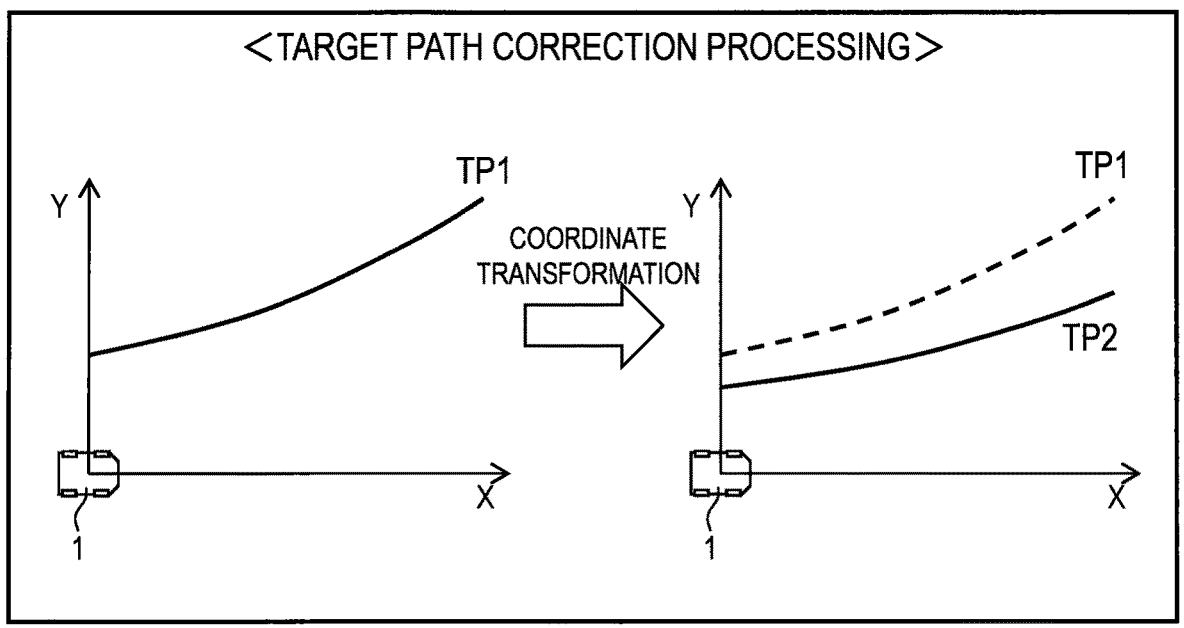
FIG. 5 is a conceptual diagram for explaining target path correction processing in the first embodiment of the present disclosure.

In view of the above, the autonomous driving system according to the present embodiment performs "target path correction processing" that corrects the first target path TP1 to the second target path TP2. FIG. 5 is a conceptual diagram for explaining the target path correction processing in the present embodiment. As described above, the first target path TP1 defined in the first coordinate system is calculated from the necessary information acquired at the first position P1 (first timing T1). In the target path correction processing, the autonomous driving system performs "coordinate transformation" from the first coordinate system to the second coordinate system to correct (convert) the first target path TP1 to the second target path TP2. Complicated computation processing is unnecessary for the coordinate transformation, and it is possible to easily obtain the second target path TP2.

Figure 6:
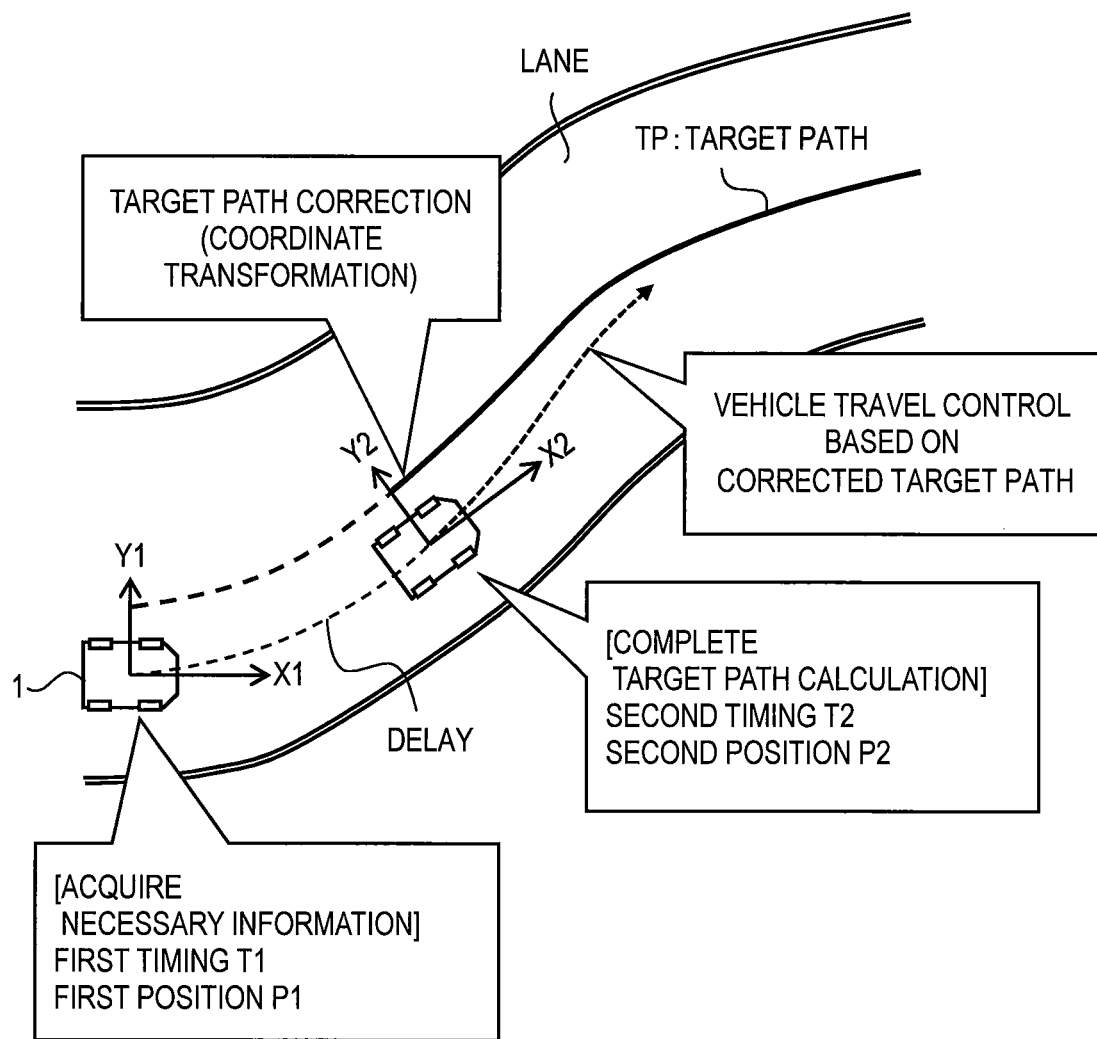
FIG. 6 is a conceptual diagram for explaining the path-following control by the autonomous driving system according to the first embodiment of the present disclosure.

FIG. 6 shows in a summarized manner the path-following control by the autonomous driving system according to the present embodiment. At the first timing T1 (i.e. the first position P1), the autonomous driving system acquires the necessary information. After that, at the second timing T2 (i.e. the second position P2), the autonomous driving system completes calculation of the target path TP based on the necessary information at the first position P1, that is, the first target path TP1. Furthermore, the autonomous driving system performs the target path correction processing to correct the calculated first target path TP1 to the second target path TP2. Then, the autonomous driving system uses the second target path TP2 as the target path TP to perform the vehicle travel control such that the vehicle 1 follows the second target path TP2.

1-2. Effects

As described above, the autonomous driving system according to the present embodiment performs the target path correction processing in the path-following control. More specifically, the autonomous driving system corrects the first target path TP1 defined in the first coordinate system to the second target path TP2 defined in the second coordinate system. Influence of the control delay is reduced by the target path correction processing. Therefore, when the second target path TP2 after the correction is used to perform the vehicle travel control, the control error becomes smaller and the control accuracy becomes higher as compared with the case where the first target path TP1 is used. In other words, the performance of following the target path TP is increased. When the path-following performance of the autonomous driving system is increased, the senses of anxiety and strangeness of the occupant of the vehicle 1 are reduced, which contributes to increase in confidence in the autonomous driving system.

It should be noted that, in the example shown in FIGS. 3 to 6, the target path calculation time is considered as a representative factor for the control delay. However, the present embodiment is not limited to that. For example, the control delay due to another factor (the information communication time, the actuator response time, and so forth) may be taken into consideration. Alternatively, a part of the target path calculation time may be taken into consideration. When generalized, it is enough that the second timing T2 is delayed from the first timing T1 by a time corresponding to at least a part of the control delay. Even when the second timing T2 is a little later than the first timing T1, the influence of the control delay is somewhat reduced by the target path correction processing according to the present embodiment.

Moreover, complicated computation processing is unnecessary for the target path correction processing according to the present embodiment. It is possible to easily obtain the second target path TP2 by performing simple coordinate transformation from the first coordinate system to the second coordinate system.

As a comparative example, let us consider the technique disclosed in the above-mentioned Patent Literature 1. According to the technique, "prediction processing" is necessary for calculating the high-precision second control command value. More specifically, the vehicle motion state and the obstacle state detected by the sensors are used to predict future vehicle motion state and obstacle state. Then, the high-precision second control command value is calculated based on the predicted future vehicle motion state and obstacle state. However, such the prediction processing requires complicated computation processing, which causes increase in computation load, computation time, and computational resource.

On the other hand, according to the present embodiment, the prediction processing as in the comparative example is unnecessary. For example, there is no need to predict the necessary information to be acquired at the future second timing T2 in order to calculate the high-precision second target path TP2. It is the necessary information acquired at the first timing T1 that is used for calculating the target path TP. The first target path TP1 is calculated from the necessary information acquired at the first timing T1, and then the second target path TP2 is obtained by the simple coordinate transformation. Since complicated prediction processing is unnecessary, increase in the computation load, computation time, and computational resource is suppressed.

As described above, the autonomous driving system according to the present embodiment can increase the path-following performance with suppressing increase in the computation load. Hereinafter, a concrete configuration example of the autonomous driving system according to the present embodiment will be described.

1-3. Configuration Example of Autonomous Driving System

Figure 7:
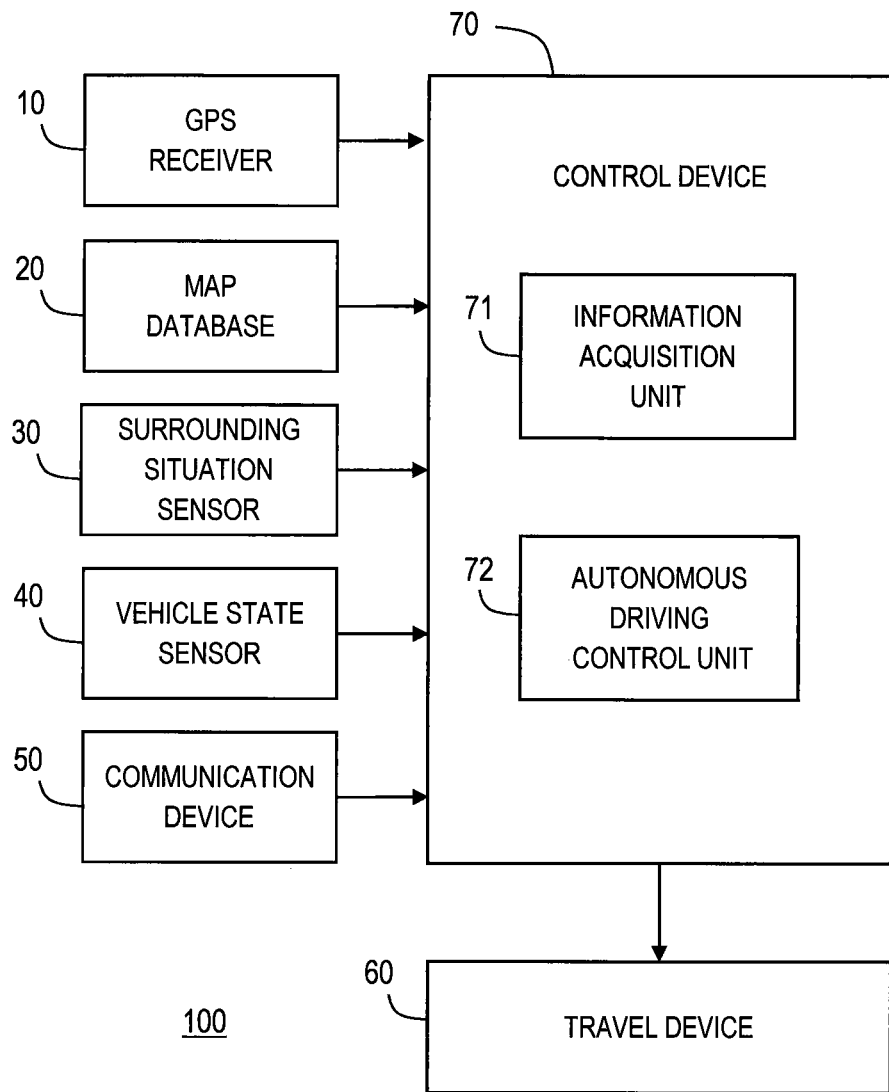
FIG. 7 is a block diagram showing a configuration example of the autonomous driving system according to the first embodiment of the present disclosure.

FIG. 7 is a block diagram showing a configuration example of the autonomous driving system 100 according to the present embodiment. The autonomous driving system 100 is mounted on the vehicle 1 and controls the autonomous driving of the vehicle 1. More specifically, the autonomous driving system 100 is provided with a GPS (Global Positioning System) receiver 10, a map database 20, a surrounding situation sensor 30, a vehicle state sensor 40, a communication device 50, a travel device 60, and a control device 70.

The GPS receiver 10 receives signals transmitted from a plurality of GPS satellites and calculates a position and an orientation of the vehicle 1 based on the received signals. The GPS receiver 10 sends the calculated information to the control device 70.

Information indicating a boundary position of each lane on a map is beforehand recorded in the map database 20. The boundary position of each lane is represented by a point group or a line group. The map database 20 is stored in a predetermined storage device.

The surrounding situation sensor 30 detects a situation around the vehicle 1. The surrounding situation sensor 30 is exemplified by a LIDAR (Laser Imaging Detection and Ranging), a radar, a camera, and the like. The LIDAR uses laser lights to detect a target around the vehicle 1. The radar uses radio waves to detect a target around the vehicle 1. The camera images a situation around the vehicle 1. The surrounding situation sensor 30 sends the detected information to the control device 70.

The vehicle state sensor 40 detects a travel state of the vehicle 1. The vehicle state sensor 40 is exemplified by a vehicle speed sensor, a steering angle sensor, a yaw rate sensor, a lateral acceleration sensor, and the like. The vehicle speed sensor detects a speed of the vehicle 1. The steering angle sensor detects a steering angle of the vehicle 1. The yaw rate sensor detects a yaw rate of the vehicle 1. The lateral acceleration sensor detects a lateral acceleration of the vehicle 1. The vehicle state sensor 40 sends the detected information to the control device 70.

The communication device 50 performs a V2X communication (i.e. a vehicle-to-vehicle communication and a vehicle-to-infrastructure communication). More specifically, the communication device 50 performs a V2V communication (a vehicle-to-vehicle communication) with another vehicle. In addition, the communication device 50 performs a V2I communication (a vehicle-to-infrastructure communication) with a surrounding infrastructure. Through the V2X communication, the communication device 50 can acquire information on an environment around the vehicle 1. The communication device 50 sends the acquired information to the control device 70.

The travel device 60 includes a steering device, a driving device, a braking device, a transmission, and so forth. The steering device turns wheels. The driving device is a power source that generates a driving force. The driving device is exemplified by an engine and an electric motor. The braking device generates a braking force.

The control device 70 performs autonomous driving control that controls the autonomous driving of the vehicle 1. Typically, the control device 70 is a microcomputer including a processor, a memory device, and an input/output interface. The control device 70 is also called an ECU (Electronic Control Unit). The control device 70 receives a variety of information through the input/output interface. The control device 70 performs the autonomous driving control based on the received information.

More specifically, the control device 70 includes an information acquisition unit 71 and an autonomous driving control unit 72 as functional blocks. These functional blocks are achieved by the processor of the control device 70 executing a control program stored in the memory device. The control program may be recorded on a computer-readable recording medium. The information acquisition unit 71 performs information acquisition processing. The autonomous driving control unit 72 performs autonomous driving control processing.

Figure 8:
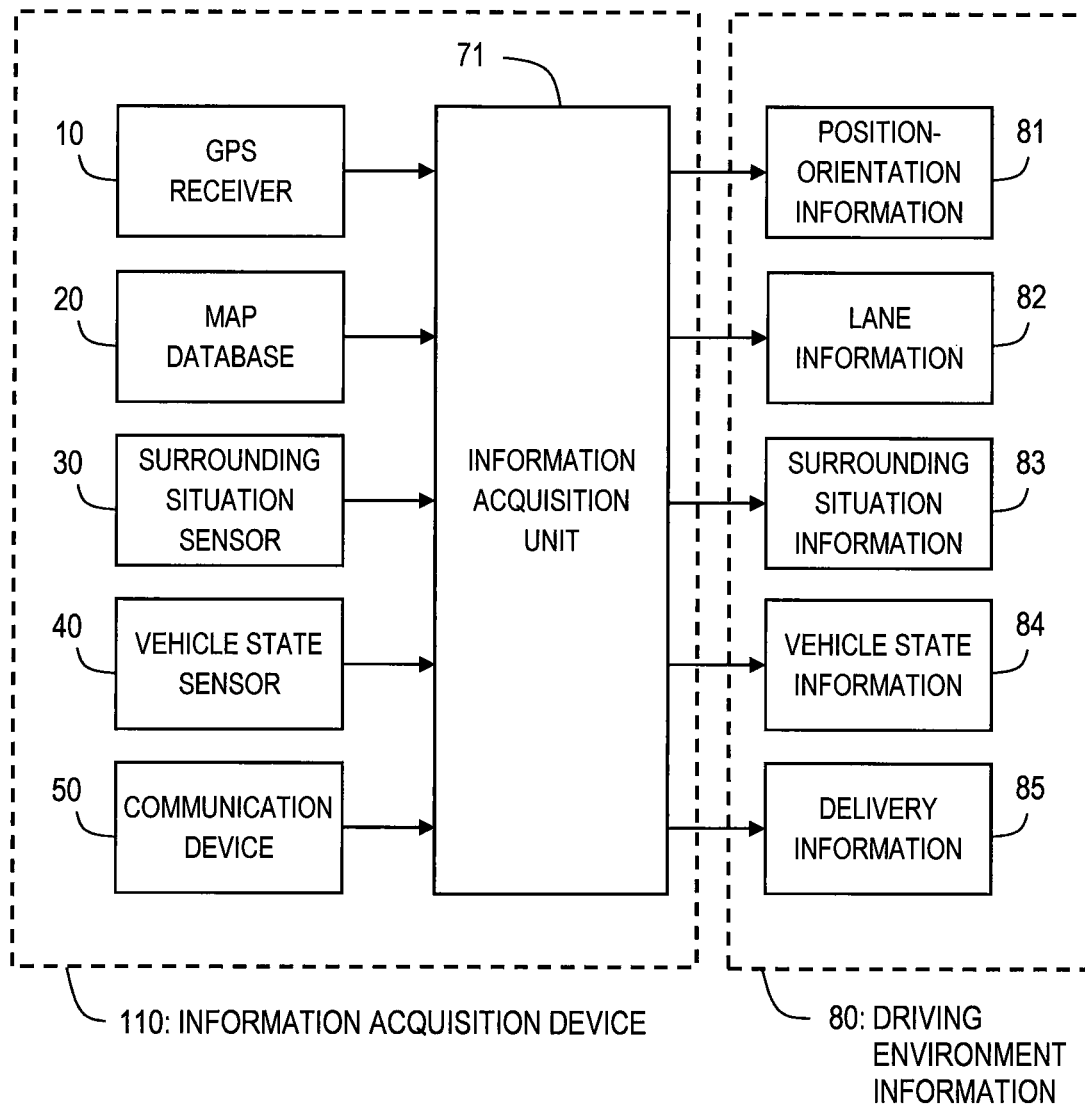
FIG. 8 is a block diagram for explaining information acquisition processing by the autonomous driving system according to the first embodiment of the present disclosure.

FIG. 8 is a block diagram for explaining the information acquisition processing according to the present embodiment. In the information acquisition processing, the information acquisition unit 71 acquires information necessary for the autonomous driving control. The information acquisition processing is repeatedly executed every certain cycle.

More specifically, the information acquisition unit 71 acquires, from the GPS receiver 10, position-orientation information 81 indicating current position and orientation of the vehicle 1.

Moreover, the information acquisition unit 71 reads the information regarding lanes from the map database 20 to generate lane information 82. The lane information 82 includes a geometry (i.e. position, shape, and orientation) of each lane on a map. Based on the lane information 82, the information acquisition unit 71 can recognize lane merging, lane branching, lane intersecting, and the like. Besides, the information acquisition unit 71 can also calculate a lane curvature, a lane width, and the like based on the lane information 82.

Moreover, the information acquisition unit 71 generates surrounding situation information 83 based on the information detected by the surrounding situation sensor 30. The surrounding situation information 83 includes target information regarding the target around the vehicle 1. The target is exemplified by a white line, a roadside structure, a surrounding vehicle, and so forth.

Moreover, the information acquisition unit 71 generates vehicle state information 84 based on the information detected by the vehicle state sensor 40. The vehicle state information 84 includes information on the speed, the steering angle, the yaw rate, the lateral acceleration, and so forth of the vehicle 1.

Moreover, the information acquisition unit 71 receives delivery information 85 through communication by the communication device 50. The delivery information 85 is information delivered from the infrastructure and the surrounding vehicle. The delivery information 85 is exemplified by roadwork section information, accident information, and so forth.

All of the position-orientation information 81, the lane information 82, the surrounding situation information 83, the vehicle state information 84, and the delivery information 85 as exemplified above indicate driving environment for the vehicle 1. Information indicating such the driving environment for the vehicle 1 is hereinafter referred to as "driving environment information 80". That is to say, the driving environment information 80 includes the position-orientation information 81, the lane information 82, the surrounding situation information 83, the vehicle state information 84, and the delivery information 85.

It can be said that the information acquisition unit 71 of the control device 70 has a function of acquiring the driving environment information 80. As shown in FIG. 8, the information acquisition unit 71 together with the GPS receiver 10, the map database 20, the surrounding situation sensor 30, the vehicle state sensor 40, and the communication device 50 constitute an "information acquisition device 110". The information acquisition device 110 as a part of the autonomous driving system 100 performs the information acquisition processing described above.

Figure 9:
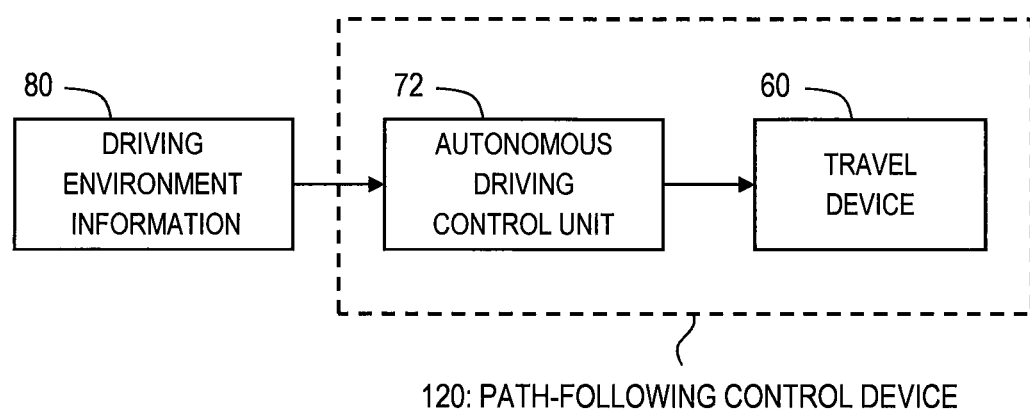
FIG. 9 is a block diagram for explaining autonomous driving control processing by the autonomous driving system according to the first embodiment of the present disclosure.

FIG. 9 is a block diagram for explaining the autonomous driving control processing according to the present embodiment. The autonomous driving control unit 72 performs autonomous driving control based on the above-described driving environment information 80. In particular, the autonomous driving control unit 72 performs the path-following control as a part of the autonomous driving control. In the path-following control, the autonomous driving control unit 72 calculates the target path TP of the vehicle 1 and controls travel of the vehicle 1 so as to follow the target path TP. The travel of the vehicle 1 can be controlled by appropriately actuating the travel device 60.

The autonomous driving control unit 72 and the travel device 60 constitute a "path-following control device 120". The path-following control device 120 as a part of the autonomous driving system 100 performs the path-following control. Hereinafter, the path-following control by the path-following control device 120 according to the present embodiment will be described in more detail.

1-4. Path-Following Control Device

Figure 10:
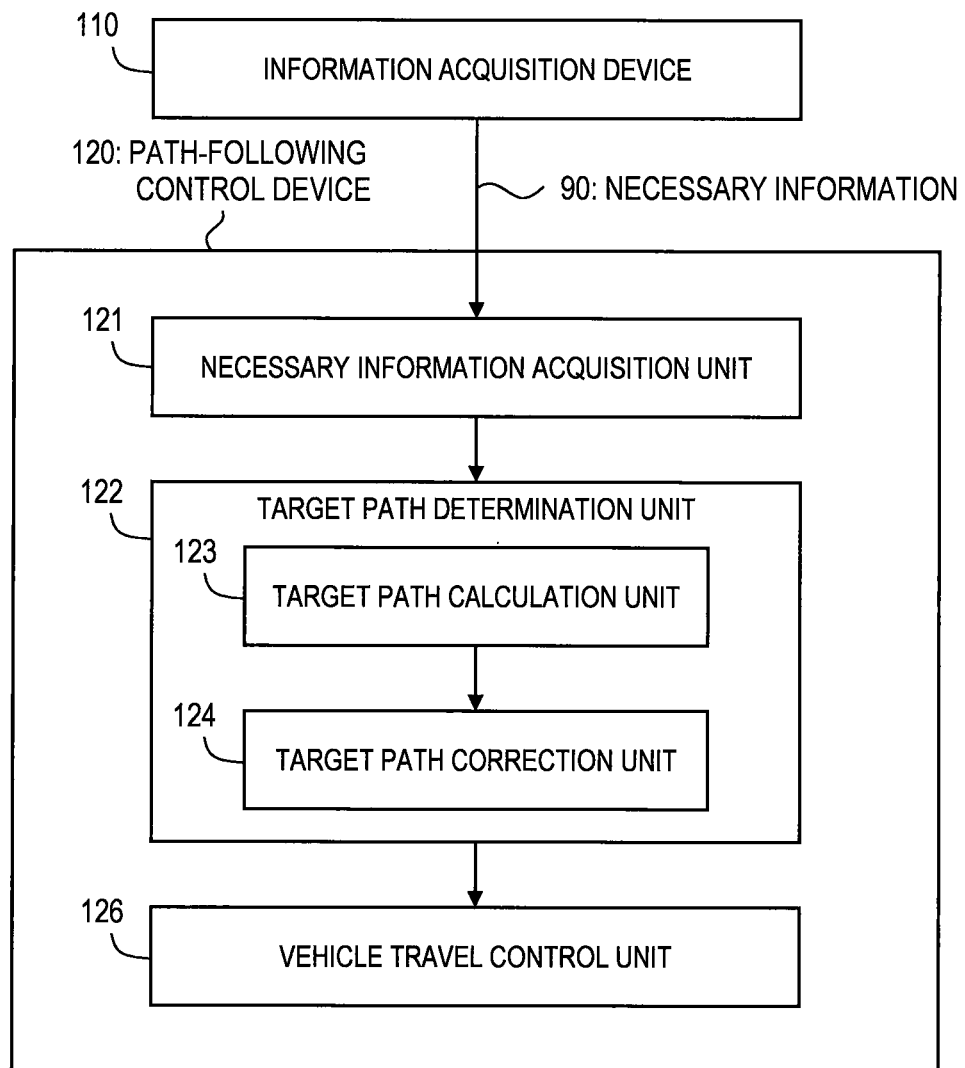
FIG. 10 is a block diagram showing a functional configuration of a path-following control device of the autonomous driving system according to the first embodiment of the present disclosure.

FIG. 10 is a block diagram showing a functional configuration of the path-following control device 120 according to the present embodiment. The path-following control device 120 includes a necessary information acquisition unit 121, a target path determination unit 122, and a vehicle travel control unit 126. The target path determination unit 122 includes a target path calculation unit 123 and a target path correction unit 124.

Figure 11:
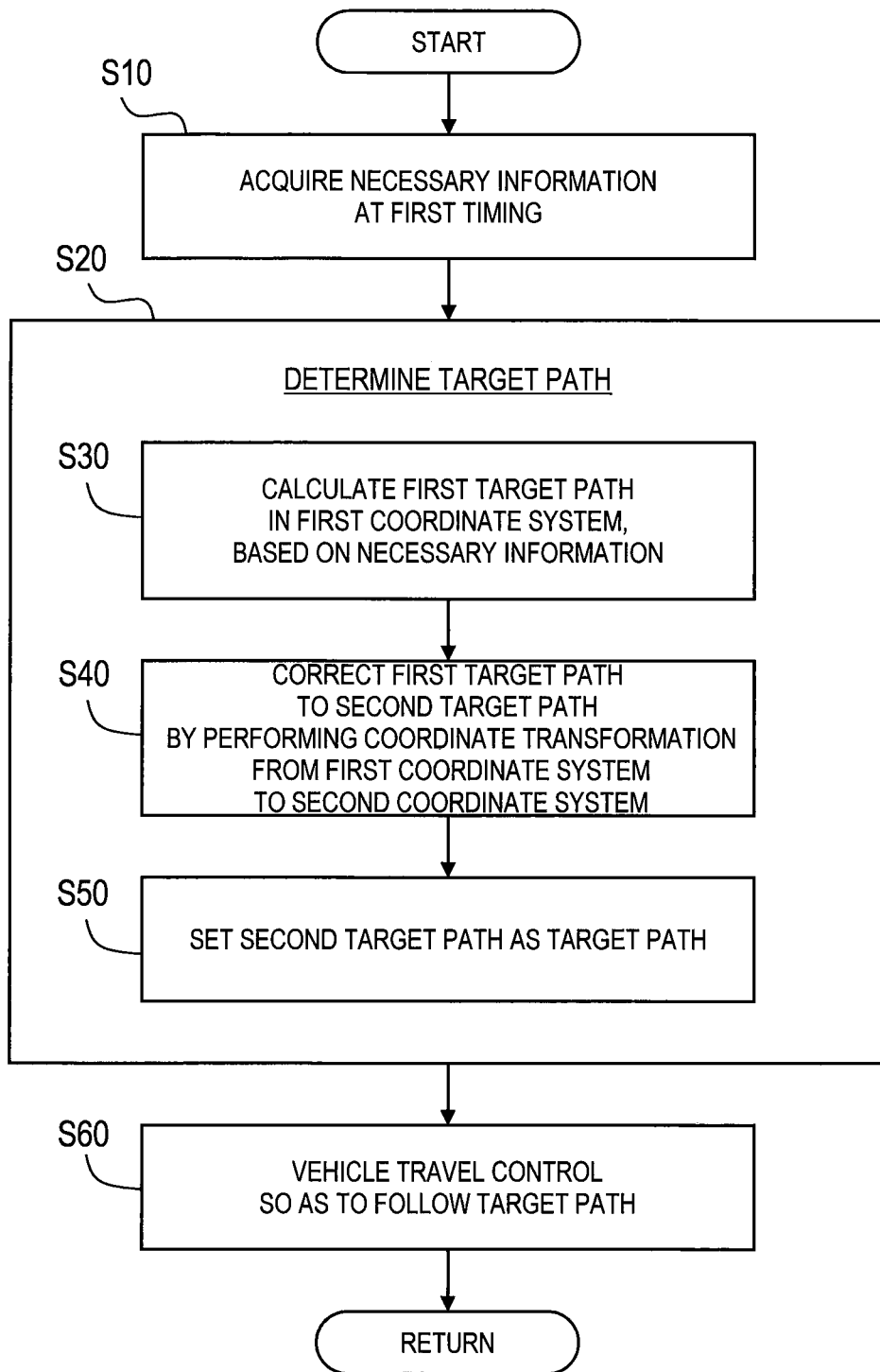
FIG. 11 is a flow chart showing the path-following control by the path-following control device according to the first embodiment of the present disclosure.

FIG. 11 is a flow chart showing the path-following control by the path-following control device 120 according to the present embodiment. The path-following control by the path-following control device 120 according to the present embodiment will be described with reference to FIGS. 10 and 11.

Step S10:

The necessary information acquisition unit 121 periodically acquires necessary information 90 through the information acquisition device 110. The necessary information 90 is information necessary for calculating the target path TP and is a part of the driving environment information 80 described above. For example, the necessary information 90 includes the position-orientation information 81, the lane information 82, the surrounding situation information 83, and the delivery information 85. A timing when the necessary information acquisition unit 121 acquires the necessary information 90 is the first timing T1 (see FIGS. 3 and 6). The necessary information acquisition unit 121 acquires the necessary information 90 and outputs the necessary information 90 to the target path determination unit 122 every first timing T1.

Step S20:

The target path determination unit 122 determines the target path TP based on the necessary information 90 acquired at Step S10. More specifically, Step S20 includes the following Steps S30 to S50.

Step S30:

First, the target path calculation unit 123 performs target path calculation processing. More specifically, the target path calculation unit 123 calculates the target path TP based on the necessary information 90 acquired at Step S10. Various methods of calculating the target path TP have been proposed. In the present embodiment, the method of calculating the target path TP is not limited in particular. The necessary information 90 is one acquired at the first position P1, and the target path TP calculated based on the necessary information 90 is the first target path TP1 (see FIG. 4) defined in the first coordinate system. That is to say, the target path calculation unit 123 calculates the first target path TP1 based on the necessary information 90.

Step S40:

After the first target path TP1 is calculated, the target path correction unit 124 performs the target path correction processing (see FIG. 5). More specifically, the target path correction unit 124 performs coordinate transformation from the first coordinate system to the second coordinate system to correct (convert) the first target path TP1 to the second target path TP2 defined in the second coordinate system.

The first coordinate system is the vehicle coordinate system at the first timing T1 when the necessary information 90 is acquired. The second coordinate system is the vehicle coordinate system at the second timing T2 later than the first timing T1. A difference between the first coordinate system and the second coordinate system can be calculated, for example, from the position-orientation information 81 at both the first timing T1 and the second timing T2. Alternatively, a difference between the first coordinate system and the second coordinate system can be calculated based on the vehicle state information 84 (the vehicle speed, the yaw rate, and the like) at the first timing T1 and a delay time from the first timing T1 to the second timing T2.

It is preferable that the delay time from the first timing T1 to the second timing T2 is predetermined. In this case, setting information indicating the delay time is beforehand stored in the memory device of the control device 70. The target path correction unit 124 can recognize the delay time and the second timing T2 by reference to the setting information. When the delay time from the first timing T1 to the second timing T2 is predetermined, the target path correction processing is further simplified, which is preferable.

For example, the delay time from the first timing T1 to the second timing T2 is set to correspond to the target path calculation time (i.e. the time required for the target path calculation unit 123 to calculate the target path TP). In this case, performing the target path correction processing makes it possible to reduce influence of the control delay caused by the target path calculation time.

Step S50:

The target path determination unit 122 sets the second target path TP2 obtained at Step S40 as the target path TP. Then, the target path determination unit 122 outputs the target path TP to the vehicle travel control unit 126.

Step S60:

The vehicle travel control unit 126 performs the vehicle travel control that controls the travel of the vehicle 1 so as to follow the target path TP (see FIGS. 2 and 6). More specifically, based on the parameters such as the lateral deviation Ed, the orientation angle difference $\theta d$, the curvature of the target path TP and the like, the vehicle travel control unit 126 calculates a vehicle control amount for reducing the deviation of the vehicle 1 from the target path TP. Then, the vehicle travel control unit 126 actuates the travel device 60 in accordance with the calculated vehicle control amount.

For example, the travel device 60 includes a power steering device (EPS: Electric Power Steering) for turning wheels of the vehicle 1. It is possible to turn the wheels by performing driving control of a motor of the power steering device. The vehicle travel control unit 126 calculates a target steering angle required for following the target path TP. In addition, the vehicle travel control unit 126 acquires an actual steering angle from the vehicle state information 84. Then, the vehicle travel control unit 126 calculates a motor current command value according to a difference between the actual steering angle and the target steering angle, and drives the motor in accordance with the motor current command value. In this manner, the vehicle travel control is achieved.

1-5. Modification Example

The delay time from the first timing T1 to the second timing T2 is not necessarily limited to the target path calculation time. For example, the delay time from the first timing T1 to the second timing T2 may be set in consideration of the information communication time, the actuator response time, and the like.

When the delay time from the first timing T1 to the second timing T2 is the target path calculation time, the delay time may be actually measured, instead of giving a predetermined value as the delay time. More specifically, at the above-described Step S30, the target path calculation unit 123 measures a processing time of the target path calculation processing and outputs the measurement result to the target path correction unit 124. The target path correction unit 124 can recognize the second timing T2 and the second coordinate system based on the measurement result.

2. Second Embodiment 2-1. Outline

The necessary information 90 necessary for calculating the target path TP is periodically acquired and updated. Every time the necessary information 90 is updated, the target path TP is determined and updated as well. In the following description, a suffix "k−1" represents the previous and a suffix "k" represent the latest.

Figure 12:
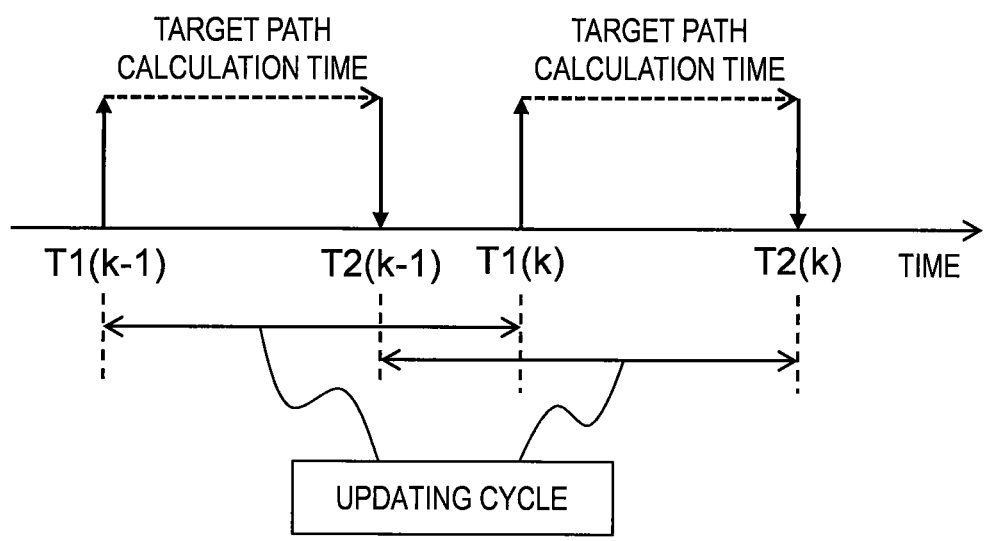
FIG. 12 is a conceptual diagram for explaining an updating cycle in a second embodiment of the present disclosure.
Figure 13:
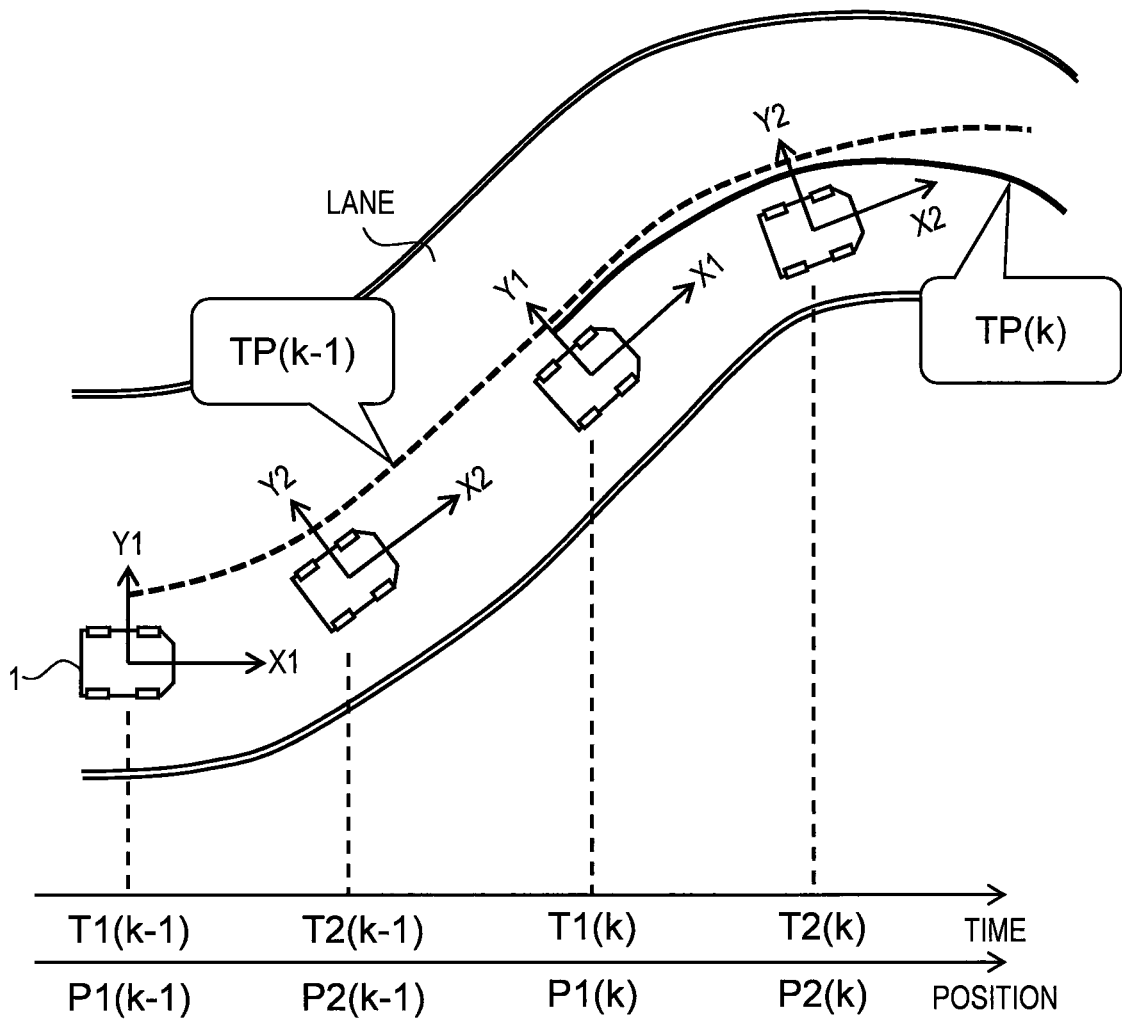
FIG. 13 is a conceptual diagram for explaining a problem to be solved in the second embodiment of the present disclosure.

FIGS. 12 and 13 show an example of updating of the necessary information 90 and the target path TP. At the previous first timing T1(k−1), the previous necessary information 90 is acquired. At the previous second timing T2(k−1), the previous target path TP(k−1) is obtained. At the first timing T1(k), the new necessary information 90 is acquired.

At the second timing T2(k), the new target path TP(k) is obtained. That is, the target path TP is updated.

During a period from the first timing T1(k) to the second timing T2(k), the new target path TP(k) is under calculation and not yet determined. Therefore, during the period from the first timing T1(k) to the second timing T2(k), the vehicle travel control is performed based on the previous target path TP(k−1). At the second timing T2(k), the new target path TP(k) is determined. After that, the vehicle travel control can be performed based on the new target path TP(k).

Here, let us consider a case where the previous target path TP(k−1) and the new target path TP(k) are irrelevant to each other and not continuous, as shown in FIG. 13. In this case, the vehicle control amount in the vehicle travel control changes discontinuously at a timing when the target path TP is switched. The discontinuous change in the vehicle control amount causes sudden change and disturbance in vehicle behavior and thus gives the occupant of the vehicle 1 senses of strangeness and anxiety. In view of the above, the second embodiment of the present disclosure proposes target path calculation processing that can suppress the discontinuous change in the vehicle control amount.

Figure 14:
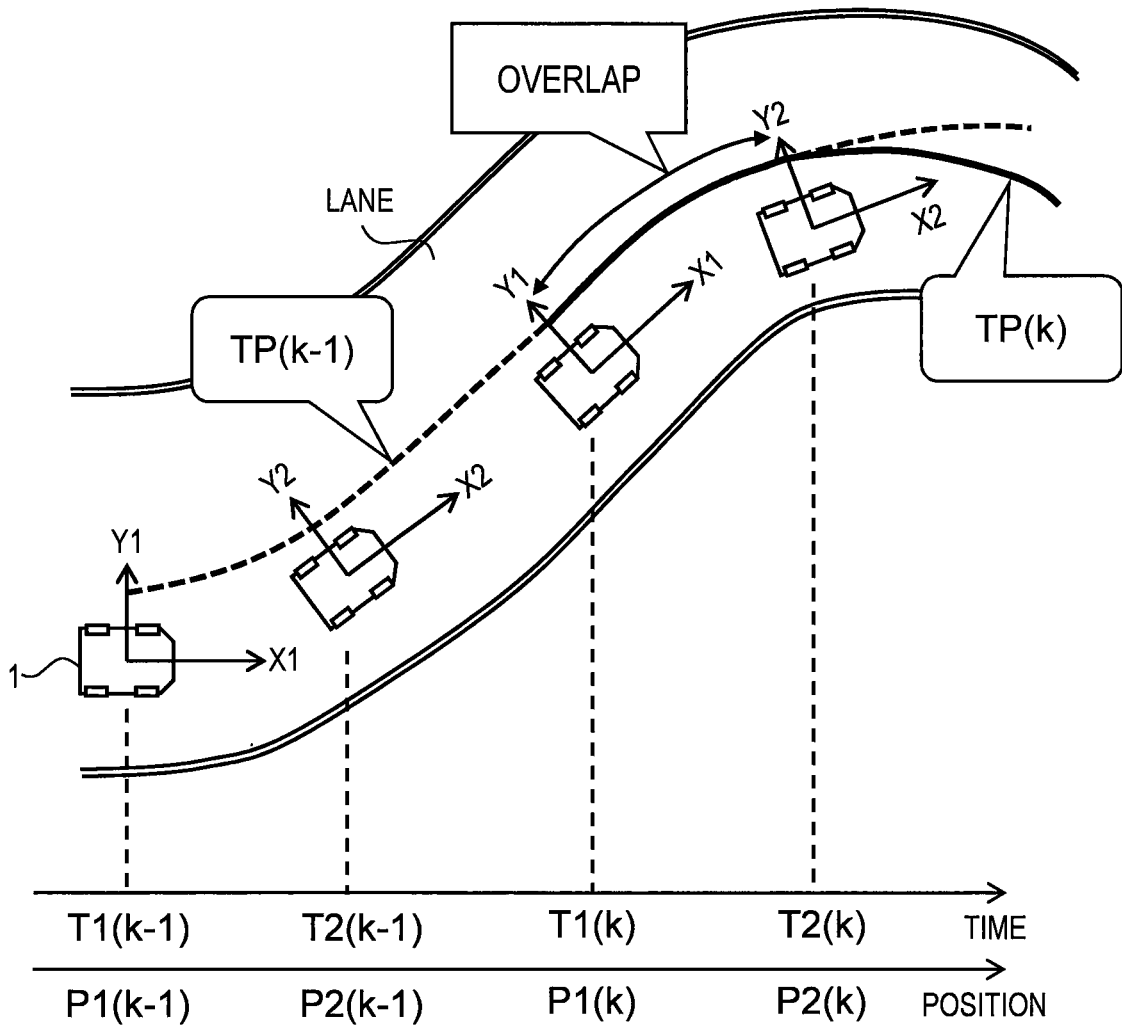
FIG. 14 is a conceptual diagram for explaining target path calculation processing in the second embodiment of the present disclosure.

FIG. 14 is a conceptual diagram for explaining the target path calculation processing in the second embodiment. According to the second embodiment, the new target path TP(k) is determined so as to partially overlap the previous target path TP(k−1). More specifically, as shown in FIG. 14, the new target path TP(k) is determined such that a certain section from the beginning of the new target path TP(k) overlaps the previous target path TP(k−1). The certain section includes at least a section from the first position P1(k) at the first timing T1(k) to the second position P2(k) at the second timing T2(k).

Due to the target path calculation processing described above, the new target path TP(k) and the previous target path TP(k−1) are connected smoothly. In particular, the new target path TP(k) overlaps the previous target path TP(k−1) in the section from the first position P1(k) to the second position P2(k). Therefore, at the second position P2(k), there is no discontinuity between the previous target path TP(k−1) and the new target path TP(k). Thus, the discontinuous change in the vehicle control amount is suppressed when the target path TP is switched. As a result, sudden change and disturbance in the vehicle behavior are suppressed.

2-2. Path-Following Control Device

Figure 15:
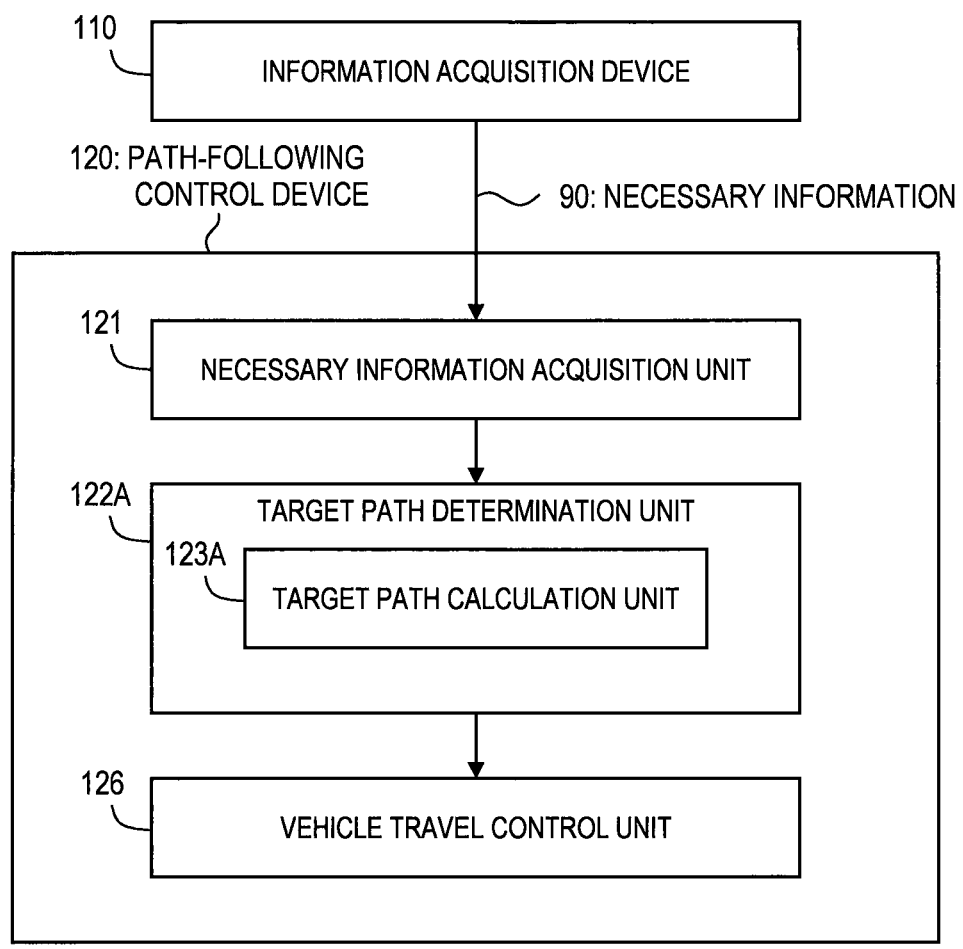
FIG. 15 is a block diagram showing a functional configuration of the path-following control device of the autonomous driving system according to the second embodiment of the present disclosure.

FIG. 15 is a block diagram showing a functional configuration of the path-following control device 120 according to the second embodiment. An overlapping description with the first embodiment shown in FIG. 10 will be omitted as appropriate. The path-following control device 120 according to the second embodiment includes a target path determination unit 122A in place of the target path determination unit 122. The target path determination unit 122A includes a target path calculation unit 123A.

Figure 16:
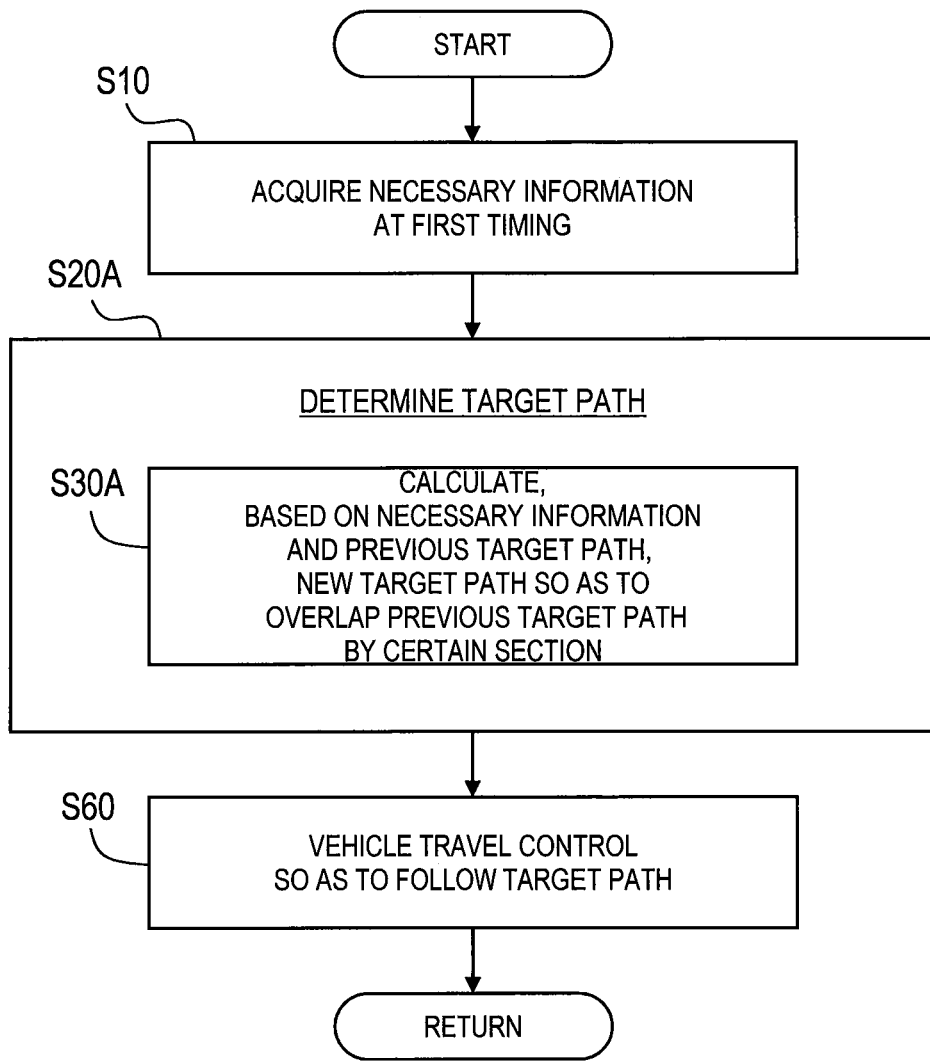
FIG. 16 is a flow chart showing the path-following control by the path-following control device according to the second embodiment of the present disclosure.

FIG. 16 is a flow chart showing the path-following control by the path-following control device 120 according to the second embodiment. An overlapping description with the first embodiment shown in FIG. 11 will be omitted as appropriate. In the second embodiment, Step S20 is replaced by Step S20A.

Step S20A:

The target path determination unit 122A determines the target path TP based on the necessary information 90 acquired at Step S10. More specifically, Step S20A includes the following Step S30A.

Step S30A:

The target path calculation unit 123A performs the target path calculation processing based on the necessary information 90 and the previous target path TP(k−1). More specifically, the target path calculation unit 123A calculates the new target path TP(k) such that a certain section from the beginning of the new target path TP(k) overlaps the previous target path TP(k−1). The certain section includes at least the section from the first position P1(k) to the second position P2(k).

The target path determination unit 122A outputs the target path TP(k) calculated at Step S30A to the vehicle travel control unit 126. The target path TP is switched from the previous target path TP(k−1) to the new target path TP(k), and the vehicle travel control unit 126 starts the vehicle travel control based on the new target path TP(k). At the switching timing, discontinuous change in the vehicle control amount is suppressed. As a result, sudden change and disturbance in the vehicle behavior are suppressed.

3. Third Embodiment

A third embodiment of the present disclosure is a combination of the first embodiment and the second embodiment. An overlapping description with the first embodiment or the second embodiment will be omitted as appropriate.

Figure 17:
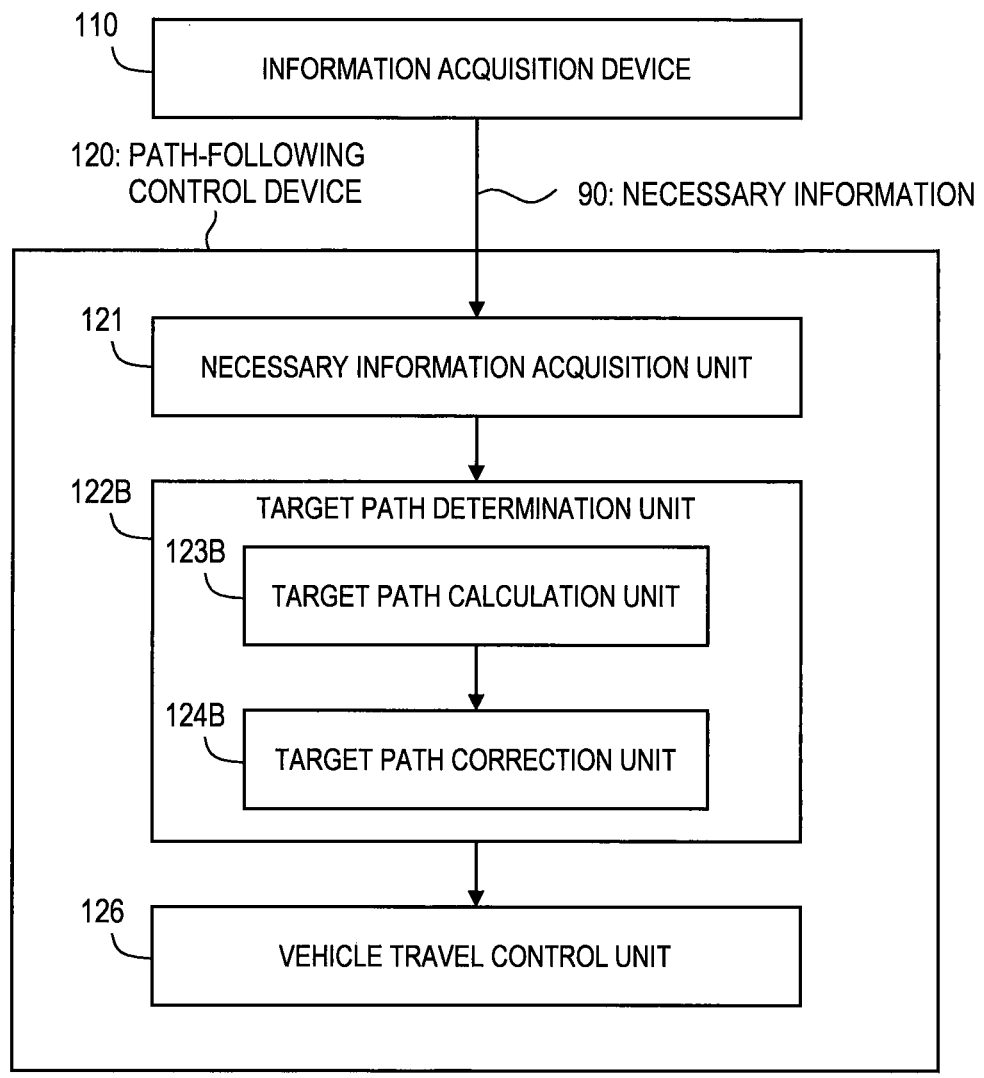
FIG. 17 is a block diagram showing a functional configuration of the path-following control device of the autonomous driving system according to a third embodiment of the present disclosure.

FIG. 17 is a block diagram showing a functional configuration of the path-following control device 120 according to the third embodiment. The path-following control device 120 according to the third embodiment includes a target path determination unit 122B in place of the target path determination unit 122. The target path determination unit 122B includes a target path calculation unit 123B and a target path correction unit 124B.

Figure 18:
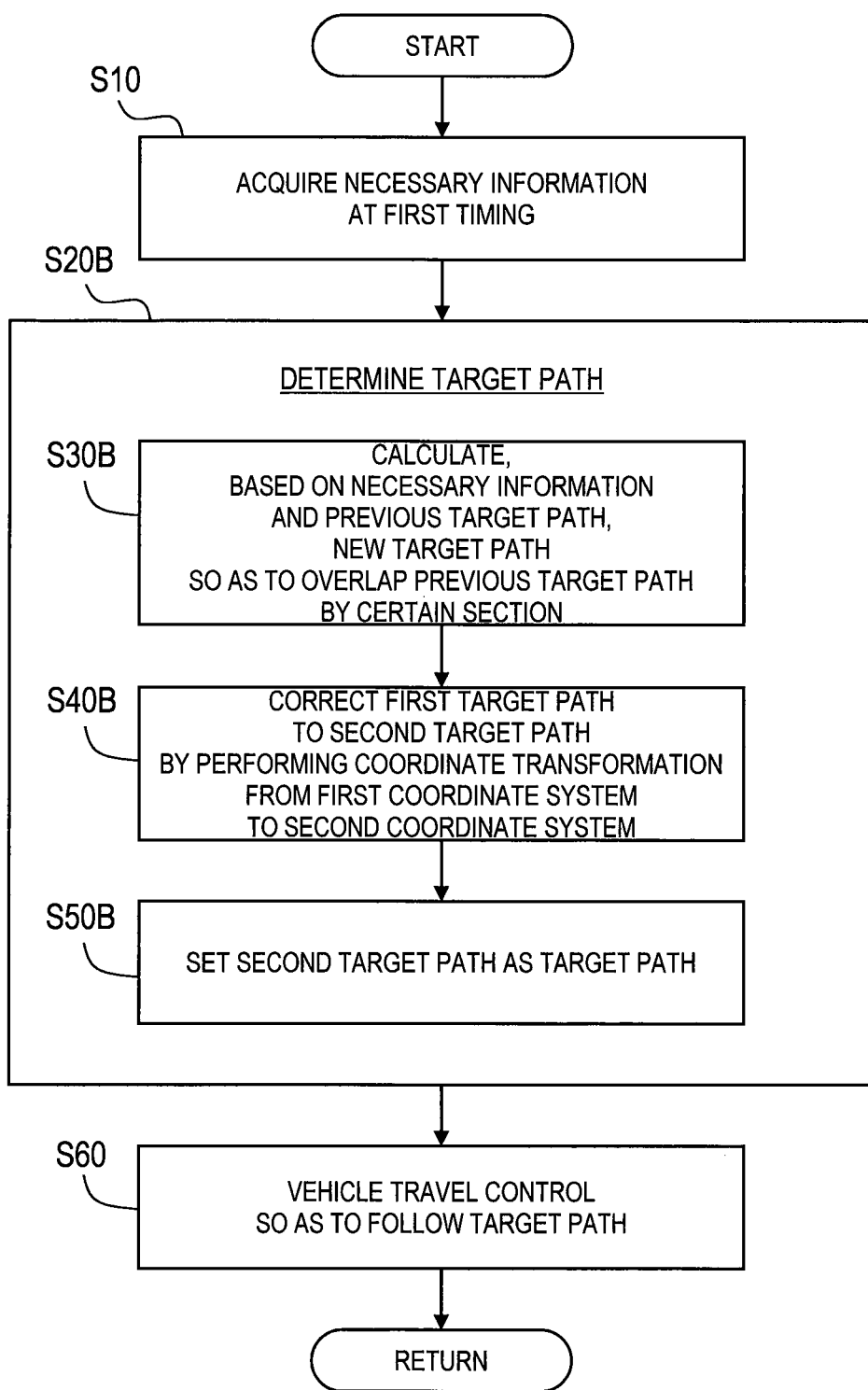
FIG. 18 is a flow chart showing the path-following control by the path-following control device according to the third embodiment of the present disclosure.

FIG. 18 is a flow chart showing the path-following control by the path-following control device 120 according to the third embodiment. In the third embodiment, Step S20 is replaced by Step S20B.

Step S20B:

The target path determination unit 122B determines the target path TP based on the necessary information 90 acquired at Step S10. More specifically, Step S20B includes the following Steps S30B to S50B.

Step S30B:

The target path calculation unit 123B performs the target path calculation processing based on the necessary information 90 and the previous target path TP(k−1). More specifically, the target path calculation unit 123B calculates the new target path TP(k) such that a certain section from the beginning of the new target path TP(k) overlaps the previous target path TP(k−1). The certain section includes at least the section from the first position P1(k) to the second position P2(k). The target path TP(k) calculated at Step S30B is the first target path TP1(k) defined in the first coordinate system.

Step S40B:

After the latest first target path TP1(k) is calculated, the target path correction unit 124B performs the target path correction processing (see FIG. 5). More specifically, the target path correction unit 124B performs coordinate transformation from the first coordinate system to the second coordinate system to correct the first target path TP1(k) to the second target path TP2(k) defined in the second coordinate system.

Step S50B:

The target path determination unit 122B sets the second target path TP2(k) obtained at Step S40B as the target path TP. Then, the target path determination unit 122B outputs the target path TP to the vehicle travel control unit 126.

According to the third embodiment, both of the effects by the first embodiment and the effects by the second embodiment are obtained.

What is claimed is:

1. An autonomous driving system mounted on a vehicle, comprising:
a memory storing instructions and a processor programmed to execute the instructions so as to:
periodically acquire information that is necessary for calculating a target path and includes position-orientation information, lane information, and surrounding situation information;
determine the target path based on the acquired information; and
control at least one actuator to perform vehicle travel control that controls travel of the vehicle so as to follow the target path, wherein
a vehicle coordinate system is a relative coordinate system that is fixed to the vehicle, and centered on the vehicle with an origin of the vehicle coordinate system coinciding with the vehicle, the vehicle coordinate system being relative and non-fixed with respect to an environment surrounding the vehicle,
a first timing is a timing when the processor acquires the information,
a first coordinate system is the vehicle coordinate system that is fixed to the vehicle at the first timing,
a second coordinate system is the vehicle coordinate system that is fixed to the vehicle at a second timing later than the first timing, and
the processor is further programmed to execute the instructions so as to:
calculate, based on the acquired information acquired at the first timing, a first target path defined in the first coordinate system;
correct the first target path to a second target path defined in the second coordinate system by performing coordinate transformation from the first coordinate system to the second coordinate system; and
perform the vehicle travel control by setting the second target path as the target path,
wherein a delay time from the first timing to the second timing corresponds to a time required for the processor to calculate the first target path.

2. The autonomous driving system according to claim 1, wherein a delay time from the first timing to the second timing is predetermined.

3. The autonomous driving system according to claim 1, wherein
the processor determines and updates the target path every time the processor acquires the necessary information,
the processor determines a new target path such that a certain section from beginning of the new target path overlaps a previous target path, and
the certain section includes at least a section corresponding to a period from the first timing to the second timing.

4. The autonomous driving system according to claim 1, further comprising a GPS receiver, a map database, a sensor configured to detect an image of an area surrounding the vehicle, and a vehicle state sensor configured to detect a travel state of the vehicle, wherein the information that is necessary for calculating the target path is obtained from at least one from among the GPS receiver, the map database, the sensor configured to detect an image of an area surrounding the vehicle, and the vehicle state sensor.

* * * * *